Patented Jan. 27, 1953

2,626,944

UNITED STATES PATENT OFFICE 2,626,944

α-ACYLAMIDO ACRYLIC ACIDS

Harry W. Coover, Jr., and Joseph B. Dickey, Rochester, N. Y., assignors to Eastman Kodak Company, Rochester, N. Y., a corporation of New Jersey No Drawing. Application December 9, 1949, Serial No. 132,214

13 Claims. (Cl. 260—78)

This invention relates to α-substituted acrylic acids and more particularly to α-acylamidoacrylic acids and polymers thereof.

A variety of α-substituted acrylic acids and their polymers have been described in the patent literature and elsewhere. Bergmann and Grafe, Z. Physiol. Chem., 187, 187–195 (1930), described the preparation of the simplest α-acylamidoacrylic acid, α-acetamidoacrylic acid, but do not disclose any method of polymerizing the compound. We have found that the compound resists polymerization under a wide variety of conditions and with the usual catalysts. This apparently accounts for the fact that no description of polymers of the compound appears in the literature.

We have made the surprising and important discovery that the compound can be polymerized in the presence of alkali, such as alkali metal hydroxide, ammonia and alkyl-substituted ammonium compounds. More surprising perhaps, is the discovery that, contrary to the behavior of the α-acetamino compound, the homologues, e. g., α-propionamidoacrylic acid, will polymerize not only in the presence of alkali but with the usual peroxide type of catalyst alone.

The α-acylamidoacrylic acids of the invention have the general formula:

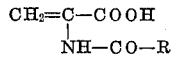

where R is an alkyl group or an aryl group of the benzene series, e. g., methyl, ethyl, propyl, isopropyl, n-butyl, isobutyl, amyl, phenyl, etc.

As mentioned, the usual catalysts can be employed for the homopolymerization and copolymerization of compounds of the above formula other than the α-acetamino compound, and these catalysts include hydrogen peroxide, benzoyl peroxide, potassium persulfate or ultraviolet light, etc., and certain so-called activating agents such as sodium bisulfite may be used in conjunction with the usual catalysts.

The polymers of the invention are soluble in organic solvents, in some cases in water and in most cases in alkaline solutions. Therefore, they may be spun as fibers in a suitable medium. Textile materials prepared therefrom are especially suitable for medicinal purposes, e. g., sutures, bandages and packs, and copolymers made by polymerization with monomers such as acrylonitrile have especially good dyeing properties.

Copolymers of the acrylic acids of the invention can be obtained by the polymerization of a mixture comprising one of the acids of the invention and one or more other compounds containing a polymerizable $CH_2=C<$ or $—CH=C<$ group; for example, vinyl halides, acrylates, the α-methacrylates, fumarates, maleates, vinyl esters, alkyl alkenyl ketones, α-acyloxyalkenyl nitriles, alkenyl nitriles, and hydrocarbons containing conjugated olefinic unsaturation such as styrenes.

More specifically, monomers which can be polymerized with the compounds of the invention are those set forth in the Magoffin et al., U. S. patent application Serial No. 773,736, filed September 12, 1947. Copolymers with acrylonitriles, vinyl esters, styrenes and vinyl halides are especially valuable such as copolymers of acrylonitrile, α-methacrylonitrile, styrene, o-, m-, and p-methyl styrenes, vinyl acetate, vinyl propionate, vinyl butyrate, and methyl methacrylate.

The acrylic acids of the invention can be prepared, for example, by condensing the appropriate acylamide with pyruvic acid and then splitting out one of the acylamide groups as shown in the following reaction:

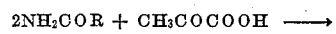

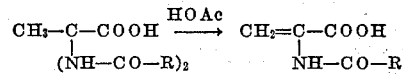

Acylamides are readily condensed with pyruvic acid to give high yields of α,α-diacylamido propionic acids. The condensation is usually carried out by reacting 2 equivalents of an acylamide with 1 equivalent of pyruvic acid. The reaction mixture is heated at 100–110° C. under a vacuum of 10–15 mm. for 3–5 hours. The use of catalytic amounts of strong acids such as concentrated hydrochloric acid greatly speeds up the condensation. The next step in the synthesis involves the splitting out of one of the acylamido groups. This reaction is readily brought about by heating the α,α-diacylamido propionic acid at reflux for 2 to 8 minutes in 1 to 10 volumes of glacial acetic acid. In most cases, upon cooling the reaction mixture to 0° C., the resulting α-acylamido acrylic acid precipitates out in excellent yields.

The Coover et al. U. S. patent application Serial No. 132,216, filed concurrently herewith, also describes the preparation of the α-acylamidoacrylic acids and claims the polymers of their salts.

The following examples give in detail methods of preparing the acrylic acids of the invention and the homopolymers and copolymers thereof:

Example 1.—α-Acetamidoacrylic acid 100 grams of α,α-diacetamido propionic acid were added to 500 g. of glacial acetic acid. The mixture was heated rapidly to reflux and kept at this temperature for eight minutes. The reaction mixture was then rapidly cooled to 0° C. and the precipitated product filtered. Recrystallization from ethyl alcohol gave an 85% yield of pure α-acetamidoacrylic acid, M. P. 198–200° C.

Example 2.—α,α-Dipropionamido propionic acid 146 grams of propionamide and 88 g. of pyruvic acid were put into a reaction flask equipped for distillation. The reaction mixture was heated in an oil bath at 100° C. until the propionamide was dissolved. Several drops of concentrated hydrochloric acid were added and heating was continued under a 15–20 mm. vacuum for 4 hours. The solid product was removed from the reaction flask and washed with benzene. A 76% yield of α,α-dipropionamido propionic acid, M. P. 163–165° C. was obtained.

Example 3.—α-Propionamido acrylic acid 10 grams of α,α-dipropionamido propionic acid were added to 20 g. of glacial acetic acid and heated at reflux for 5 minutes. The reaction mixture was cooled to 0° C. and a 60% yield of α-propionamido acrylic acid, M. P. 156° C., was obtained.

Example 4

10 grams of α-propionamido acrylic acid were placed in 100 cc. of water and polymerized by heating at 50° C. A viscous aqueous solution of the polymer was obtained. The use of 0.01% persulfate greatly speeds up the polymerization. Any desired salt can be prepared by adding the desired quantity of a base such as sodium hydroxide, ammonium hydroxide, triethanol amine, and so forth.

Example 5

10 grams of α-propionamido acrylic acid, 1 g. α-ethoxycarbonamido acrylic acid and 1 g. α-palmitylcarbonamido acrylic acid were polymerized in mass using 0.01 g. benzoyl peroxide as a catalyst at 40° C. A tough, horn-like, slightly yellowish moldable polymer was obtained.

Example 6

2 grams of α-propionamido acrylic acid, 8 g. of methyl methacrylate and 0.2 g. of benzoyl peroxide were heated at 80° C. for 24 hours. The resultant, hard, clear polymer is soluble in acetone and can be molded.

Example 7

2 grams of α-butyramido acrylic acid and 10 grams of acrylonitrile were added to 100 ml. of distilled water containing 0.2 gram of ammonium persulfate and 0.1 gram of sodium bisulfite. The polymerization was complete after heating at 40° C. for 12 hours. The resultant precipitated polymer was filtered, washed with water and dried. The polymer does not soften below 180° C. and is soluble in dimethyl formamide.

The above examples provide copolymers from mixtures of various proportions of the acids with other monomers. In general, we can obtain valuable resins from mixtures of monomers containing from 5–95% by weight of the acids of the invention; however, the preferred range depends somewhat upon the use to be made of the product and the range of 5–50% is most preferred for our purposes. It will be noted that the homopolymers of acids wherein R is of the order of 1–4 carbon atoms are usually hard and water soluble and as the length of the carbon chain is increased, the homologues are less soluble and become waxy in character.

We claim:

1. A polymer of an α-acylamidoacrylic acid of the general formula:

$$CH_2=C-COOH$$
$$\quad\quad|$$
$$\quad NH-CO-R$$

wherein R represents an alkyl group of from 1 to 4 carbon atoms.

2. A polymer of an α-acylamidoacrylic acid of the general formula:

$$CH_2=C-COOH$$
$$\quad\quad|$$
$$\quad NH-CO-R$$

wherein R represents an alkyl group of from 2 to 4 carbon atoms.

3. A polymer of α-propionamidoacrylic acid.
4. A polymer of α-butyramido acrylic acid.
5. A polymer of α-isobutyramido acrylic acid.
6. A copolymer obtained by the polymerization of a mixture comprising from 5 to 95% by weight of a compound of the general formula:

$$CH_2=C-COOH$$
$$\quad\quad|$$
$$\quad NH-CO-R$$

wherein R represents an alkyl group of from 1 to 4 carbon atoms, and from 95 to 5% by weight of a compound containing a polymerizable —CH=C< group.

7. A copolymer obtained by the polymerization of a mixture comprising from 5 to 95% by weight of a compound of the general formula:

$$CH_2=C-COOH$$
$$\quad\quad|$$
$$\quad NH-CO-R$$

wherein R represents an alkyl group of from 1 to 4 carbon atoms, and from 95 to 5% by weight of a compound containing a polymerizable $CH_2=C<$ group.

8. A copolymer obtained by the polymerization of a mixture comprising from 5 to 95% by weight of α-(propionamido) acrylic acid and from 95 to 5% by weight of a compound containing a polymerizable —CH=C< group.

9. A copolymer obtained by the polymerization of a mixture comprising from 5 to 95% by weight of α-(butyramido) acrylic acid and from 95 to 5% by weight of a compound containing a polymerizable —CH=C< group.

10. A copolymer obtained by the polymerization of a mixture comprising α-(isobutyramido) acrylic acid and a compound containing a polymerizable —CH=C< group.

11. A copolymer obtained by the polymerization of a mixture comprising α-(propionamido) acrylic acid and a compound of the group consisting of acrylonitrile, α-methacrylonitrile, styrene, o-, m-, and p-methyl styrenes, vinyl acetate, vinyl propionate, vinyl butyrate, and methyl methacrylate.

12. A copolymer obtained by the polymerization of a mixture comprising α-(n-butyramido) acrylic acid and a compound of the group consisting of acrylonitrile, α-methacrylonitrile, styrene, o-, m-, and p-methyl styrenes, vinyl acetate, vinyl propionate, vinyl butyrate, and methyl methacrylate.

13. A copolymer obtained by the polymerization of a mixture comprising α-(isobutyramido) acrylic acid and a compound of the group consisting of acrylonitrile, α-methacrylonitrile, styrene, o-, m-, and p-methyl styrenes, vinyl acetate, vinyl propionate, vinyl butyrate, and methyl methacrylate.

HARRY W. COOVER, Jr.
JOSEPH B. DICKEY.

REFERENCES CITED

The following references are of record in the file of this patent:

Z. Physiol. Chem. 187, 187–195 (1930) cf. C. A. 24, 2150–2151.